(12) United States Patent
Smith

(10) Patent No.: US 8,641,250 B2
(45) Date of Patent: Feb. 4, 2014

(54) ILLUMINATED COMPONENT FOR A VEHICLE

(75) Inventor: Nels R. Smith, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 338 days.

(21) Appl. No.: 12/663,026

(22) PCT Filed: Jun. 6, 2008

(86) PCT No.: PCT/US2008/066113
§ 371 (c)(1),
(2), (4) Date: Jul. 8, 2010

(87) PCT Pub. No.: WO2008/154378
PCT Pub. Date: Dec. 18, 2008

(65) Prior Publication Data
US 2010/0277938 A1  Nov. 4, 2010

Related U.S. Application Data

(60) Provisional application No. 60/924,989, filed on Jun. 7, 2007.

(51) Int. Cl.
*B60Q 1/00* (2006.01)
(52) U.S. Cl.
USPC .......................................... 362/509; 362/501
(58) Field of Classification Search
USPC .................................. 362/501, 509; 200/315
See application file for complete search history.

(56) References Cited

U.S. PATENT DOCUMENTS

| | | | | |
|---|---|---|---|---|
| 2,308,844 A * | 1/1943 | Wilshusen | ..................... | 362/540 |
| 4,972,173 A * | 11/1990 | Raciti | ............................ | 340/472 |
| 5,089,715 A | 2/1992 | Kokubu | | |
| 6,164,805 A | 12/2000 | Hulse | | |
| 6,911,612 B2 * | 6/2005 | Seki | ............................. | 200/339 |
| 2007/0086201 A1 * | 4/2007 | Wang | ............................. | 362/501 |
| 2007/0195542 A1 * | 8/2007 | Metros et al. | ................ | 362/501 |
| 2008/0060470 A1 * | 3/2008 | Paonessa et al. | ............. | 74/558.5 |

FOREIGN PATENT DOCUMENTS

| | | |
|---|---|---|
| DE | 42 12 838 A1 | 11/1992 |
| DE | 10 2005 055 059 A1 | 5/2007 |
| EP | 1 760 231 A2 | 3/2007 |
| JP | 19-92121631 U | 10/1992 |
| WO | WO-2008/024985 A2 | 2/2008 |

OTHER PUBLICATIONS

International Search Report corresponding to PCT/US2008/066113, dated Jan. 9, 2008, 3 pages.
Mexican Official Action dated Feb. 18, 2011 for application No. MX/a/2009/013246, 3 pages.

(Continued)

Primary Examiner — Joseph L Williams
(74) Attorney, Agent, or Firm — Foley & Lardner LLP

(57) ABSTRACT

A user interface assembly (100, 104, 200) for operating a system within a vehicle (10) is disclosed that comprises a base (110, 210) and a user interface (100, 104, 200) supported at the base (110, 210) and configured to be selectively actuated for operating the system. The user interface includes a first portion and a second portion. The interface assembly also comprises a light source (140, 240) configured to provide light into the first portion of user interface (100, 104, 200). The user interface (100, 104, 200) is configured to function as a conduit for the light directed into the first portion so that the light can be emitted from the second portion of the user interface (100, 104, 200).

20 Claims, 7 Drawing Sheets

(56) References Cited

OTHER PUBLICATIONS

Chinese First Office Action dated Oct. 27, 2011 as received in corresponding China Application No. 200880100688.3 and its English Translation.

Chinese Second Office Action dated Jul. 9, 2012 as received in corresponding China Application No. 200810100688.3 and its English Translation.

European office action received in connection with European application No. EP 08770330.2; dtd Jan. 22, 2013.

English translation of Japanese Office Action received in connection with Japanese Application No. 2010-511363 (dtd Nov. 20, 2012).

Japanese Office Action received in connection with Japanese Application No. 2010-511363 (dtd Nov. 20, 2012).

* cited by examiner

ILLUMINATED COMPONENT FOR A VEHICLE

CROSS-REFERENCE TO RELATED PATENT APPLICATIONS

This application is a National Stage of PCT/US2008/066113, filed Jun. 6, 2008, which claims the benefit and priority under 35 U.S.C. 119(e) of U.S. Provisional Application No. 60/924,989, having a filing date of Jun. 7, 2007, titled "CRYSTAL BUTTONS WITH LED". The foregoing applications are incorporated by reference herein in their entirety.

BACKGROUND

The present disclosure relates to an illuminated vehicle component. More particularly, present disclosure relates to an illuminated vehicle component such as a user interface for operating (e.g., adjusting, activating, opening, etc.) one or more systems within a vehicle.

Motor vehicles such as cars, trucks, SUVs, vans, etc. include various vehicle systems that are configured to be selectively operated by a vehicle occupant through the manipulation or actuation of a user interface (e.g., button, switch, lever, handle, etc.). For example, a motor vehicle may include a plurality of buttons or switches that are associated with the operation of power window systems, power sun roofs, power mirrors, power seats, audio systems, video systems, communication systems, navigation systems, etc.

Such switches may include a marking (e.g., text, graphics, etc.) to assist a vehicle occupant in operating the switches. Further, such switches may be lit from behind to illuminate any such markings on the switches. Switches of this type may be molded and then painted. After the switches are painted, the switches can be laser etched to remove a portion of the paint and provide for the marking. This process can be expensive and can require specialized labor. Therefore, there is a need to eliminate the painting and laser etching process for such switches, or any other vehicle component, in order to simplify manufacturing and lower associated costs. There is also a continual need to improve the aesthetics of components within a vehicle.

SUMMARY

One embodiment relates to a user interface assembly for operating a system within a vehicle. The interface assembly comprises a base and a user interface supported at the base and configured to be selectively actuated for operating the system. The user interface includes a first portion and a second portion. The interface assembly also comprises a light source configured to provide light into the first portion of user interface. The user interface is configured to function as a conduit for the light directed into the first portion so that the light can be emitted from the second portion of the user interface.

Another embodiment relates to a user interface. The user interface comprises a body formed of a material that allows light rays to pass therethrough. The body includes a first portion that is configured to be actuated by a user, a second portion that is configured to receive light emanating from a light source, and at least one edge defining the first portion. The body is configured to function as a light pipe for the light source and guide the light from the second portion of the body to the at least one edge to provide for an edge lit user interface.

Another embodiment relates to a vehicle component. The vehicle component comprises a body formed of a material that allows light rays to pass therethrough. The body includes a first portion that is configured to be viewable by a vehicle occupant and a second portion that is configured to receive light emanating from a light source. The body is configured to function as a light pipe for the light source and guide the light from the second portion so that the light can be emitted from the first portion of the body.

DETAILED DESCRIPTION

Figure 1:
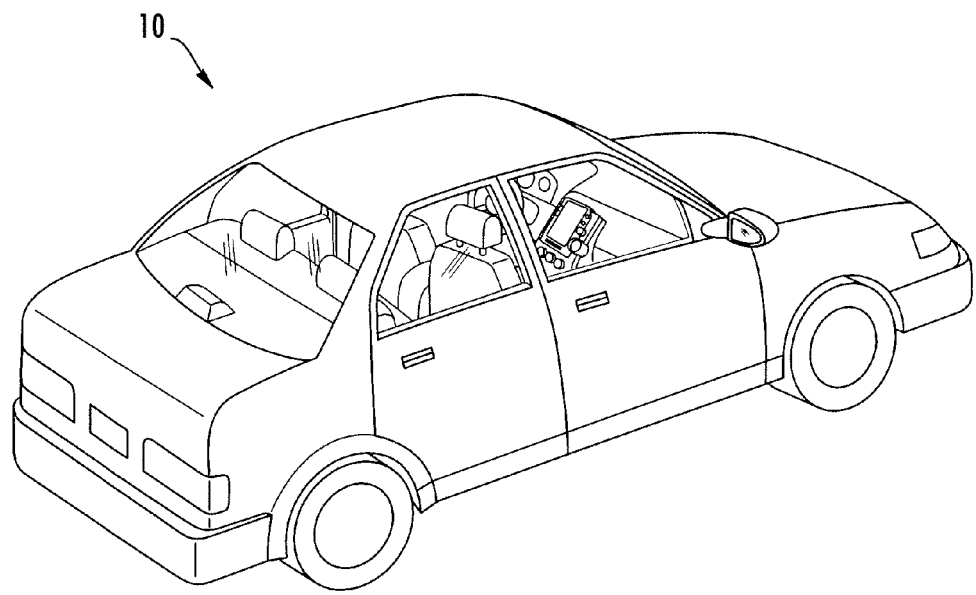
FIG. 1 is an isometric view of a vehicle with a passenger compartment having one or more vehicle components according to an exemplary embodiment.

Referring generally to FIGURES, a vehicle component is shown according to various exemplary embodiments. The vehicle component itself is configured to function as a medium or conduit for light (e.g., a light pipe, light guide, etc.) to illuminate at least a portion of the vehicle component and/or an area near the vehicle component. As such, the vehicle component is formed of a material that enables the vehicle component to serve as a conduit for light so that light entering a first portion of the vehicle component can be emitted from a second portion of the vehicle component. A lighting system including a light source (e.g., a light emitting diode, etc.) is supported at or near the vehicle component and is configured to direct light into a first portion of the vehicle component. The light emanating from the light source enters the vehicle component and travels internally through the vehicle component until exiting at one or more light emitting portions of the vehicle component. For example, the light emitting portion of the vehicle component may include one or more edge surfaces of the vehicle component (e.g., to provide for an edge lit vehicle component), a top or front surface of the vehicle component (e.g., to illuminate a marking or indicia provided on such surface) and/or a bottom or back surface of the vehicle component (e.g., to illuminate an area under or behind the vehicle component).

Such a vehicle component may improve aesthetics within a vehicle, simplify manufacturing and/or lower costs associated with providing a vehicle component that is to be illuminated. For example, such a vehicle component can eliminate or reduce the need to use a vehicle component that must be first molded, then painted, then etched and then lit from behind in order for etched markings to be seen in the dark or during operation of the vehicle in the evening hours, as such a process can be expensive and can require specialized labor.

While the vehicle component is shown and described herein as a user interface (e.g., button, switch, handle, lever, door grab, etc.) that is part of a user interface assembly, the vehicle component may be any of a variety of components of a vehicle for which it may be beneficial and/or desirable to illuminate at least a portion of the vehicle component and/or an area near the vehicle component. For example, a vehicle component may be any molded component within the vehicle (e.g., a console, decorative trim, visor, etc.) having one or more of the features described herein.

The various exemplary embodiments of the user interface assembly described herein are generally configured to be associated with one or more vehicle systems to allow a vehicle occupant to operate or control the vehicle systems. For example, the various exemplary embodiments of the user interface assembly described herein may be coupled to a power window system (e.g., to control the position of one or more windows), a power sunroof system (e.g., to control the position of a sunroof), a HVAC system (e.g., to control the temperature within the occupant compartment), a door system (e.g., to assist in ingress and/or egress) and/or any vehicle system (e.g., power mirrors, power door locks, GPS components, audio systems, video systems, cruise control, handle for opening a vehicle hood, handle for releasing a parking brake, etc.).

Referring to FIG. 1, a vehicle 10 is shown according to an exemplary embodiment. Vehicle 10, shown as a 4-door sedan, includes a passenger compartment or interior having an instrument panel or dashboard, seats, doors, etc. Provided within the passenger compartment are a variety of vehicle components and systems. For example, as shown in more detail in FIG. 2, the passenger compartment includes a first user interface assembly 100 supported at a door panel 102 of the vehicle and a second user interface assembly 104 supported at a steering wheel 106 of the vehicle.

First user interface assembly 100 and second user interface assembly 104 each include one or more user interfaces (e.g., buttons, switches, handles, levers, door grabs, etc.). For example, first user interface assembly 100 includes a first set of user interfaces, shown as four switches 120, that are provided to selectively adjust the position of one or more windows within the vehicle. First user interface assembly 100 is also shown as including a second user interface 121, shown as a door handle or release, that is provided to open the door. Second user interface assembly 104 includes a third user interface 123, shown as a switch, that is provided to control an audio system and a fourth user interface 125, also shown as a switch, that is provided to operate a cruise control system.

Figure 3:
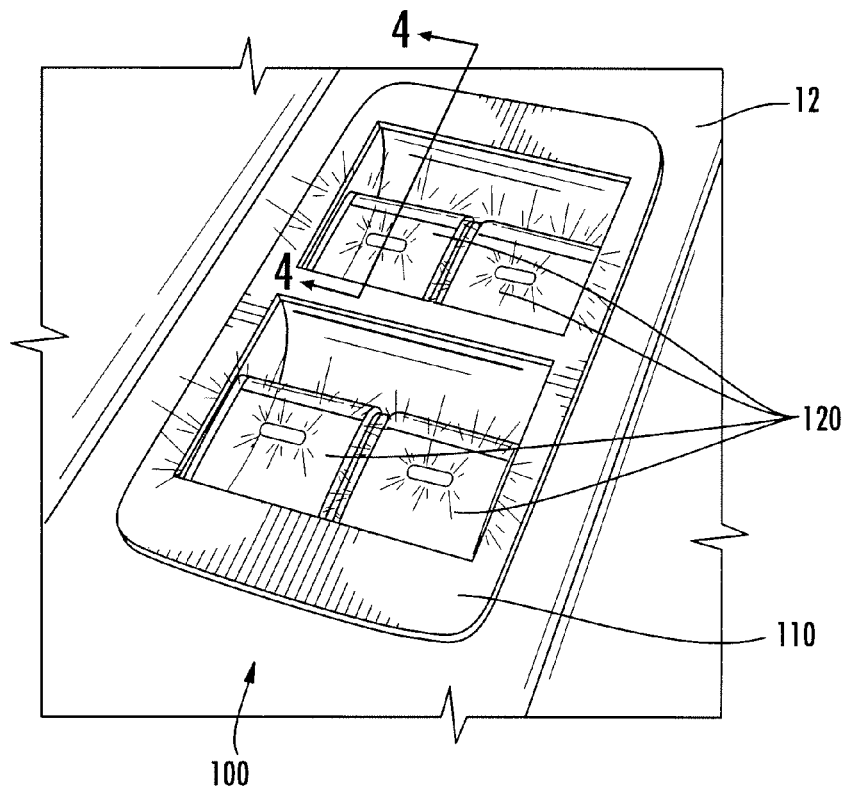
FIG. 3 is a partial detailed isometric the user interface assembly in FIG. 2 shown in an illuminated state.

Referring to FIG. 3, first user interface assembly 100 is shown in more detail. As noted above, first user interface assembly 100 is shown as including a plurality of user interfaces, shown as four buttons or switches 120, for adjusting the position (e.g., the up and down position, etc.) of various windows within the vehicle. According to the embodiment illustrated, user interface assembly 100 is supported at an armrest 102 of a driver side vehicle door 108. According to the various alternative embodiments, user interface assembly 100 may be located on any front or rear door panel, on a console situated between a driver side seat and a passenger side seat, on an overhead or rear seat console, on a steering wheel, and/or in other locations that are accessible by a vehicle occupant.

Figure 4:
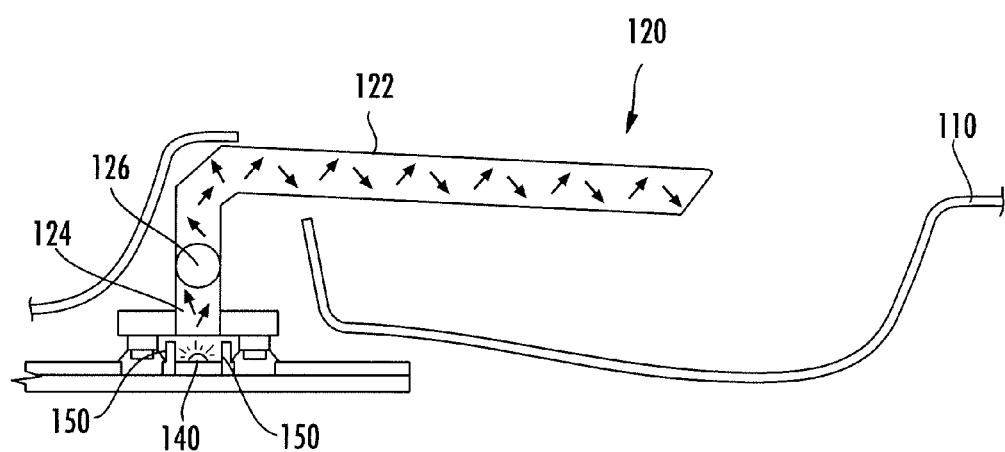
FIG. 4 is a partial cross sectional view of the user interface assembly taken along a line 4-4 in FIG. 3.

According to the embodiment illustrated, user interface assembly 100 generally includes a base (e.g., housing, support member, etc.), shown as a bezel 110, and switches 120 supported at bezel 110. Switches 120 are configured to be actuated by a vehicle occupant in order to operate the vehicle system to which switches 120 are coupled to, such as a power window system. Referring to FIG. 4, each switch 120 generally includes an actuation portion, shown as first portion 122, that a vehicle occupant is configured to actuate. Depending on the configuration of switches 120, switches 120 may be actuated by being pressed, pulled, touched, slid, exposed to motion, etc. According to the embodiment illustrated, each switch 120 is configured to be selectively moved between various positions in order to operate the windows. For example, switch 120 is configured to rotate about a pivot rod or shaft 126 when a vehicle occupant presses or pulls on a front portion of the switch. Depressing or pulling on switch 120 activates a silicone pad 150 for movement of the window.

According to the embodiment illustrated, switch 120 is a substantially L-shaped member having a first leg or wall that extends upward in a substantially vertical direction and a second leg or wall that extends inward in a substantially horizontal direction. According to the various alternative embodiments, switch 120 may include any of a number of shapes or profiles depending on the particular application in which the switch is to be used.

Still referring to FIG. 4, user interface assembly 100 also includes a lighting system having a light source 140. Light source 140 is provided to illuminate at least portion of switch 120. Light source 140 may be directly coupled to switch 120 (e.g., by being integrally molded therewith as a one-piece member, etc.), indirectly coupled to switch 120 or supported near (e.g., adjacent, etc.) switch 120. According to an exemplary embodiment, light source 140 is a light emitting diode (LED) circuit. The LED circuit may be one of several circuits described and shown in International Publication No. WO2008/024985 entitled Integrated Power Source For Interior LED Lighting and published Feb. 28, 2008, the disclosure of which is hereby incorporated by reference in its entirety. According to the various alternative embodiments, light source 140 may be any other known or otherwise suitable system.

According to the embodiment illustrated, only a single light source 140 is provided at switch 120. According to the various alternative embodiments, the lighting system may include more than one light source at each switch 120 (e.g., a plurality of LEDs). Such an embodiment could allow switch 120 to be illuminated in more than one color. For example, different colors may be used to indicate whether a window is slightly open, whether a window is in a lock mode, and/or may be provided to allow for a personalization feature, etc.

Switch 120 is at least partially illuminated by light source 140 by functioning as a medium or conduit (e.g., substrate, light, pipe, light guide, member, etc.) for light emanating from light source 140. To facilitate this feature, switch 120 is formed of a material that allows light rays to pass therethrough so that light entering a first portion of switch 120 can be emitted from a second portion of switch 120. For example, switch 120 may be formed of a substantially transparent or translucent material such as a resin, glass, quartz, etc. According to an exemplary embodiment, switch 120 is molded in a substantially clear polycarbonate or acrylic. According to the various alternative embodiments, switch 120 may be formed of any other material that may be suitable for acting as a light conduit. According to further alternative embodiments, switch 120 may be formed of a tinted material to provide for alternative coloring.

Figure 5:
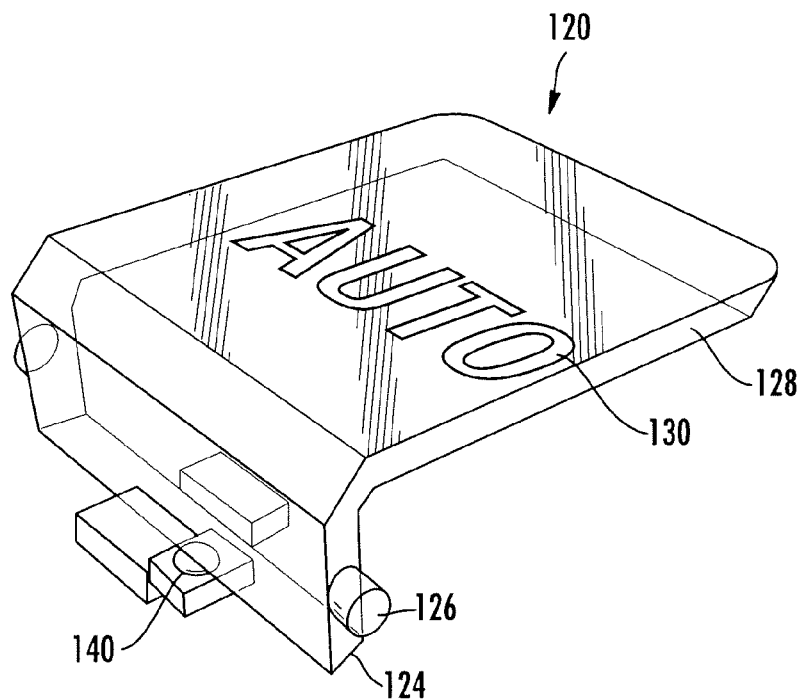
FIG. 5 is an isometric view of a user interface according to an exemplary embodiment shown in a non-illuminated state.
Figure 6:
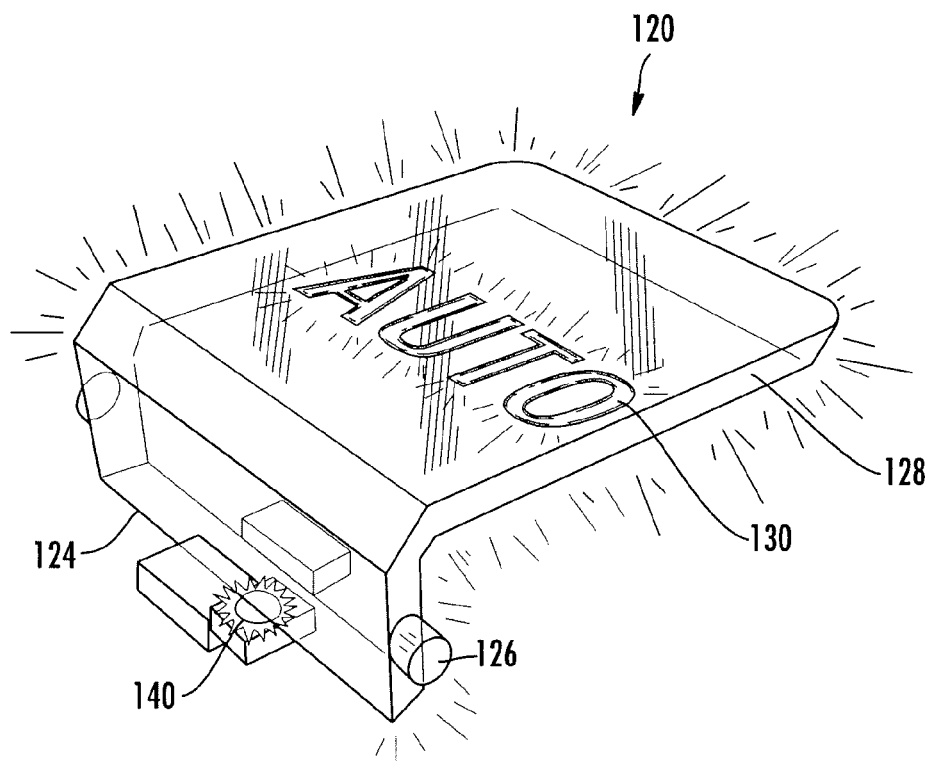
FIG. 6 is an isometric view of the user interface of FIG. 5 shown in an illuminated state.

FIG. 5 shows an isometric view of switch 120 in a non-illuminated state (e.g., when light source 140 is not activated), while FIG. 6 shows an isometric view of switch 120 in an illuminated state. Referring to FIGS. 4 through 6, switch 120 includes at least one light receiving portion, shown as a bottom edge 124, that is substantially aligned with light source 140. Light emanating from light source 140 enters the body of switch 120 through bottom edge 124 and travels internally through switch 120 until being emitted from the switch. According to the embodiment illustrated, the light from light source 140 is emitted from one or more lateral edge surfaces 128 of switch 120 to provide for an edge lit switch. The light is emitted from lateral edge surfaces 128 due to the refraction of the light in these areas.

Figure 2:
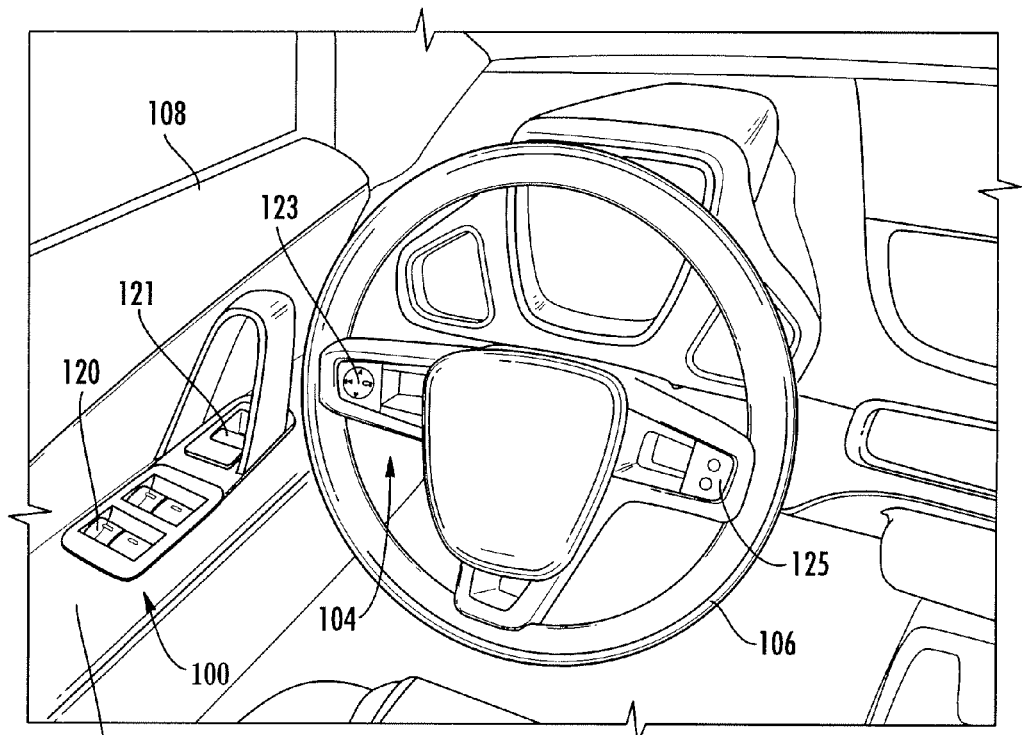
FIG. 2 is a partial isometric view of the passenger compartment of the vehicle in FIG. 1 including a user interface assembly according to an exemplary embodiment.

The location of where light is emitted from switch 120 and/or the manner (e.g., pattern, intensity, etc.) in which light is emitted from switch 120 can be controlled using any of a number of techniques. For example, it may be beneficial and/or desirable to illuminate a marking (e.g., graphics, indicia, text, etc.) provided on first portion 122 in addition to or in place of edge lighting. According to the exemplary embodiments illustrated in FIGS. 2 through 6, such a marking may include text 130, as shown in FIGS. 5 and 6 as the term AUTO, or a substantially rectangular indicator 132, as shown in FIGS. 2 and 3. Text 130 and indicator 132 are printed onto a bottom side 123 (shown in FIG. 4) of switch 120. Light passing through switch 120 is refracted by the printing thereby illuminating such a marking.

According to the various alternative embodiments, markings may be molded onto the rear side of switch 120 thereby eliminating the need for printing. According to still further alternative embodiments, the location of where light is emitted from switch 120 and/or the manner in which light is emitted from switch 120 can be controlled using films, coatings, cutouts, variations in shape (e.g., thickness, etc.), variations in molding processes or any other suitable technique. For example, a molding process that would allow rapid and even heating and cooling of the injection molding tool can be used to manufacture switch 120. Such a process allows for extremely thick sections of material without sink, knit lines, or other visible distortions that are normally associated with traditional injection molding. The resulting switch 120 could be molded to resemble cut crystal yielding a high aesthetic value. Further, a portion of switch 120 may be frosted or otherwise altered to control the output of the light.

Figure 7:
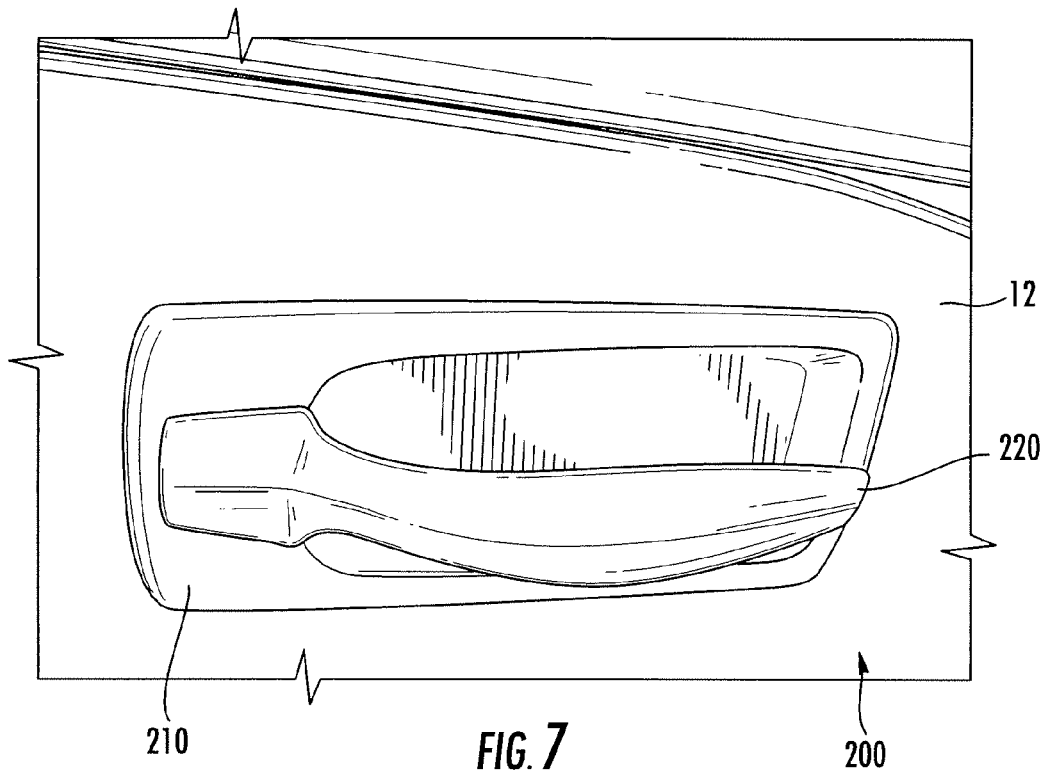
FIG. 7 is an isometric view of a user interface assembly shown according to another exemplary embodiment.
Figure 8:
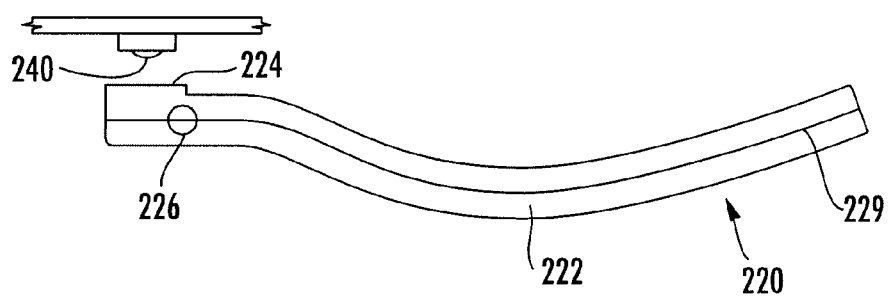
FIG. 8 is partial cross sectional view of the interface assembly of FIG. 7.

Referring to FIGS. 7 through 14, an illuminated vehicle component is shown according to other exemplary embodiments. In FIGS. 7 through 14, the illuminated vehicle component is shown as an user interface assembly 200 that is associated with a door system of the vehicle to facilitate opening and/or closing of a door. Referring to FIG. 7 in particular, user interface assembly 200 generally includes a base (e.g., housing, support member, etc.), shown as a bezel 210, and a user interface (e.g., buttons, switches, handles, levers, door grabs, etc.), shown as a release handle 220. Release handle 220 is configured to be actuated by a vehicle occupant in order to open the door. Referring to FIG. 8, release handle 220 generally includes an actuation portion, shown as first portion 222, that a vehicle occupant is configured to actuate. According to the embodiment illustrated, release handle 220 is configured to be actuated by being pulled outward and rotated about a pivot rod or shaft 226. Pulling on release handle 220 releases a latching or locking mechanism to allow for the door to open.

According to the embodiment illustrated, release handle 220 is curved outward to allow a vehicle occupant to grasp the release handle. According to the various alternative embodiments, release handle 220 may include any of a number of shapes or profiles depending on the particular application in which the switch is to be used. For example, see the configuration of the release handle 121 in FIG. 2.

Referring further to FIG. 8, user interface assembly 200 also includes a lighting system having a light source 240. Light source 240 is provided to illuminate at least portion of release handle 220. Light source 240 may be directly coupled to release handle 220 (e.g., by being integrally molded therewith as a one-piece member, etc.), indirectly coupled to release handle 220 or supported near (e.g., adjacent, etc.) release handle 220. According to an exemplary embodiment, light source 240 is a light emitting diode (LED) circuit. According to the various alternative embodiments, light source 240 may be any other known or otherwise suitable system. According to the embodiment illustrated, only a single light source 240 is provided at release handle 220. According to the various alternative embodiments, the lighting system may include more than one light source at release handle 220 (e.g., a plurality of LEDs).

Release handle 220 is at least partially illuminated by light source 240 by functioning as a medium or conduit for light emanating from light source 240. To facilitate this feature, switch 120 is formed of a material that allows light rays to pass therethrough so that light entering a first portion of release handle 220 can be emitted from a second portion of release handle 220. For example, release handle 220 may be formed of a substantially transparent or translucent material such as a resin, glass, quartz, etc. According to an exemplary embodiment, release handle 220 is molded in a substantially clear polycarbonate or acrylic. According to the various alternative embodiments, release handle 220 may be formed of any other material that may be suitable for acting as a light conduit.

Release handle 220 includes at least one light receiving portion, shown as a rear edge surface 224, that is substantially aligned with light source 240. Light emanating from light source 240 enters the body of release handle 220 through rear edge surface 224 and travels internally through release handle 220 until being emitted from the release handle. The location of where light is emitted from release handle 220 and/or the manner (e.g., pattern, intensity, etc.) in which light is emitted from release handle 220 can be controlled using any of a number of techniques.

Figure 9:
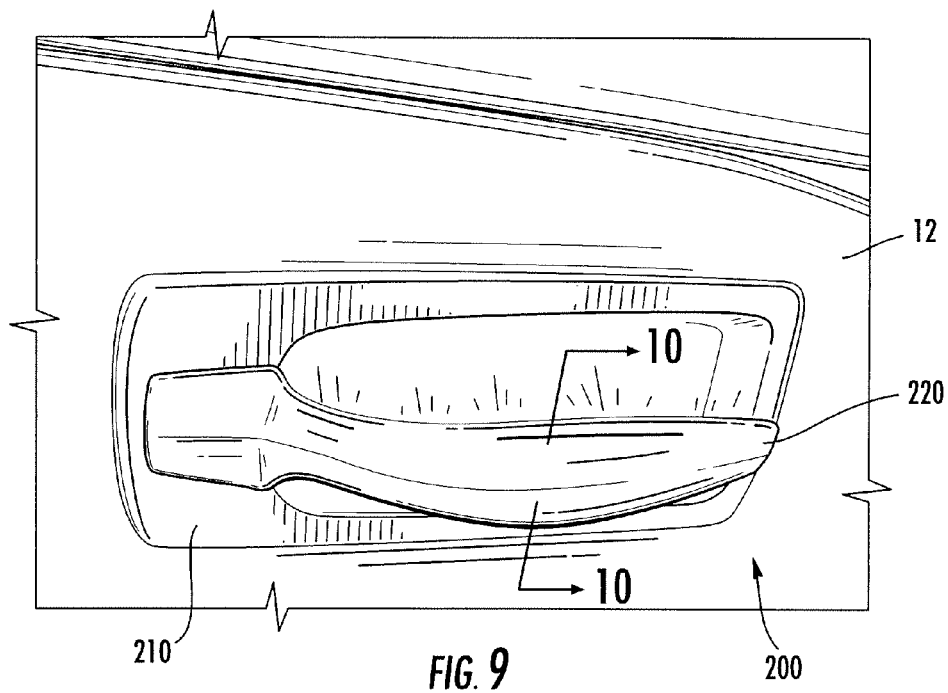
FIG. 9 is an isometric view of the interface assembly of FIG. 7 including a user interface shown in an illuminated state according to a first exemplary embodiment.
Figure 10:
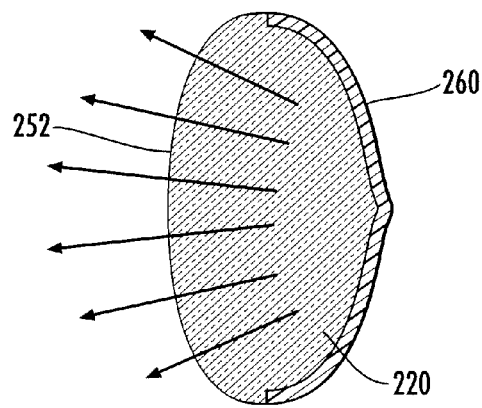
FIG. 10 is a cross sectional view of the user interface taken along a line 10-10 in FIG. 9.

FIG. 9 shows an isometric view of release handle 220 in an illuminated state according to an exemplary embodiment, while FIG. 10 shows a cross sectional view of this embodiment. Light emanating from light source 240 enters the body of release handle 220 and travels internally through release handle 220 until being emitted from a rear surface 252 of release handle 220. Such a configuration is intended to produce a flood of light reflecting off of the door, and particularly off a portion of bezel 210 behind release handle 220, to create a halo effect around the release handle. To control the distribution of light be emitted from release handle 220 in this manner, a film material 260 is provided on a front surface of release handle 220. According to the embodiment illustrated, film material 260 sufficiently opaque to substantially prevent light from passing therethrough. Film material 260 includes a backing (e.g., a white backing, etc.) that is configured to reflect the light rearward toward bezel 210. According to an exemplary embodiment, film material 260 is over molded onto release handle 220, but alternatively, may be applied to release handle 220 in any suitable manner. If release handle 220 is molded component, film material 260 may be sized to extend between the parting lines on release handle 220.

Figure 11:
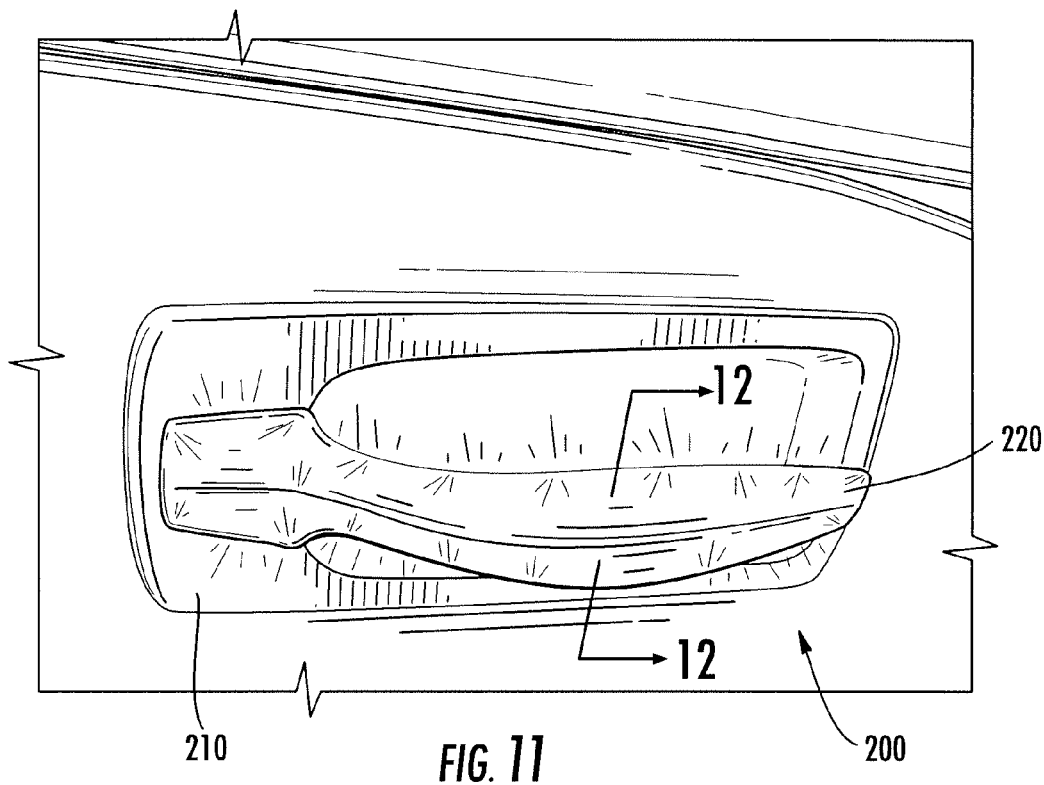
FIG. 11 is an isometric view of the interface assembly of FIG. 7 including a user interface shown in an illuminated state according to a second exemplary embodiment.
Figure 12:
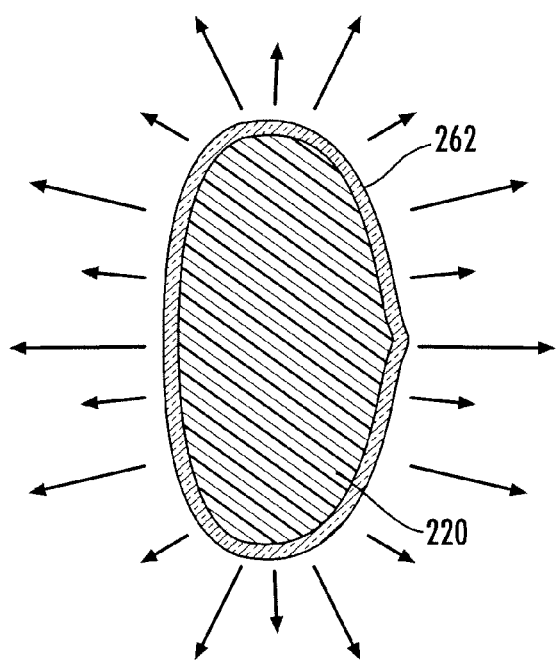
FIG. 12 is a cross sectional view of the user interface taken along a line 12-12 in FIG. 11.

FIG. 11 shows an isometric view of release handle 220 in an illuminated state according to another exemplary embodiment, while FIG. 12 shows a cross sectional view of this embodiment. Light emanating from light source 240 enters the body of release handle 220 and travels internally through release handle 220 while being evenly emitted from all areas on release handle 220. Such a configuration is intended to produce the appearance of an illuminated or glowing release handle 220 when light 240 is activated. To control the distribution of light be emitted from release handle 220 in this manner, a coating 262 is provided around substantially around the entire release handle 220. According to the embodiment illustrated, coating 262 is at least semi-transparent or semi-translucent to allow light to pass therethrough. According to an exemplary embodiment, coating 262 is a hydrographic coating applied to an outer or A-surface of release handle 220.

Figure 13:
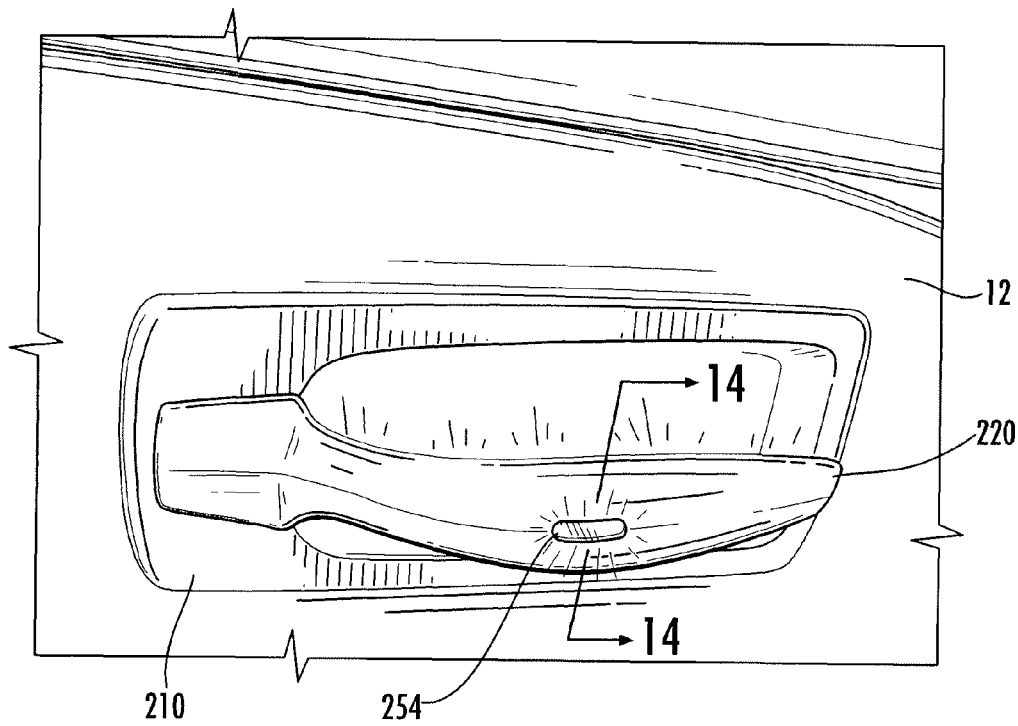
FIG. 13 is an isometric view of the interface assembly of FIG. 7 including a user interface shown in an illuminated state according to a third exemplary embodiment.
Figure 14:
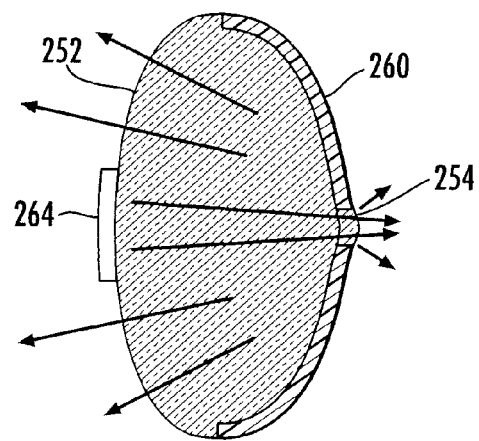
FIG. 14 is a cross sectional view of the user interface taken along a line 14-14 in FIG. 13.

FIG. 13 shows an isometric view of release handle 220 in an illuminated state according to an exemplary embodiment, while FIG. 14 shows a cross sectional view of this embodiment. Light emanating from light source 240 enters the body of release handle 220 and travels internally through release handle 220 until being emitted from a rear surface 252 of release handle 220 and a localized area on the front surface of release handle 220. Such a configuration is intended to produce a flood of light reflecting off of the door, and particularly off a portion of bezel 210 behind release handle 220, to create a halo effect around the release handle and to provide an illuminated marking on the front of release handle 220. To control the distribution of light be emitted from release handle 220 in this manner, a film material 260 is provided on a front surface of release handle 220. The film material 260 includes an aperture (e.g., opening, etc.), shown as a cutout 254, that allows the light to pass through the front surface. To direct light towards the front surface and through cutout 254, a second film material 264 is added to the back surface of release handle 220. According to the embodiment illustrated, film materials 260, 264 sufficiently opaque to substantially prevent light from passing therethrough. Film materials 260, 264 includes a backing (e.g., a white backing, etc.) that is configured to reflect the light in an opposite direction.

According to the various alternative embodiments, any other types of markings may be added to release handle 220 in a manner similar to those detailed above with reference to switch 120. For example, the location of where light is emitted from handle 220 and/or the manner in which light is emitted from handle 220 can be controlled using any of a variety of films, coatings, cutouts, variations in shape (e.g., thickness, etc.), variations in molding processes or any other suitable technique, alone or in any combination.

It is important to note that the construction and arrangement of the elements of the vehicle components as shown in the exemplary embodiment are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Further, the vehicle components may be configured in a wide variety of shapes to accommodate varying design criteria. Accordingly, all such modifications are intended to be included within the scope of the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the appended claims.

What is claimed is:

1. A user interface assembly for operating a system within a vehicle, the interface assembly comprising:
   a base;
   a user interface supported at the base and configured to be selectively actuated for operating the system, the user interface including a first portion, a second portion, and a marking; and
   a light source configured to provide light into the first portion of the user interface,
   wherein the user interface is configured to function as a conduit for the light directed into the first portion so that the light can be emitted from the second portion of the user interface;
   wherein the marking is provided on a back surface of the second portion and the marking is viewable from a front surface of the second portion of the user interface at least when the light source is illuminated; and
   wherein the second portion includes at least one lateral edge surface relative to the front and rear surfaces, and the at least one edge surface provides edge lighting on the user interface when the light source is illuminated.

2. The user interface assembly of claim 1 wherein the second portion of the user interface comprises at least two edge surfaces provided at opposing sides of the user interface relative to the front surface to provide edge lighting in at least two opposing directions on the user interface.

3. The user interface assembly of claim 1 wherein the first portion of the user interface comprises an edge surface of the user interface and the light source is supported at the edge surface.

4. The user interface assembly of claim 1 wherein the user interface is formed of a substantially clear material.

5. The user interface assembly of claim 1 wherein the marking includes one of a graphic, an indicia, and a text.

6. The user interface assembly of claim 5 wherein the marking is printed on the back surface of the second portion of the user interface.

7. The user interface assembly of claim 5 further comprising a film provided on the user interface and having a reflective backing that is configured to reflect the light toward the marking.

8. The user interface assembly of claim 1 further comprising a reflective element provided along at least a portion of a front surface of the user interface to direct light toward the base.

9. The user interface assembly of claim 8 wherein the base includes a bezel.

10. The user interface assembly of claim 8 wherein the reflective element includes an aperture for allowing at least a portion of the light to be emitted from the front surface of the user interface.

11. The user interface assembly of claim 8 wherein the reflective element is a film material integrally formed with the user interface.

12. The user interface assembly of claim 1 further comprising a hydrographic coating at least partially surrounding the user interface.

13. The user interface assembly of claim 1 wherein the user interface comprises a switch configured to operate a power window system.

14. The user interface assembly of claim 1 wherein the user interface comprises a release handle configured to operate a door.

15. A user interface comprising:
- a body formed of a material that allows light rays to pass therethrough, the body including a first portion that is configured to be actuated by a user, a second portion that is configured to receive light emanating from a light source, and a pivot;
- a first film provided on a front surface of the first portion and having a reflective backing that is configured to reflect the light toward a rear surface of the first portion, the first film having an opening therein;
- a second film provided on the rear surface of the first portion and having a reflective backing that is configured to reflect the light toward the opening in the first film; and
- a bezel provided adjacent the rear surface and configured to pivotally support the second portion by the pivot to allow rotation of the body relative to the bezel when actuated by the user;
- wherein the body is configured to function as a light pipe for the light source and guide the light from the second portion of the body to emit from the rear surface onto the bezel to create a halo effect around the body, and
- wherein the light source is coupled to the bezel.

16. The user interface of claim 15 wherein the body is formed of a substantially transparent material.

17. A vehicle component comprising:
- a housing;
- a light source coupled to the housing; and
- a body formed of a material that allows light rays to pass therethrough, the body comprising:
  - a first portion that is configured to be viewable by a vehicle occupant, the first portion including a rear surface having a marking provided thereon;
  - a second portion that extends away from an end of the first on in a direction that is generally perpendicular to the rear surface and is configured to receive light emanating from the light source; and
  - a pivot disposed on the second portion and pivotally supported by the housing to allow rotation of the body relative to the housing,
- wherein the body is configured to function as a light pipe for the light source and guide the light from the second portion so that the light can be emitted from the first portion of the body;
- wherein the marking comprising a graphic or text that is viewable by the occupant within the vehicle at least when the light source is illuminated.

18. The vehicle component of claim 17 further comprising a silicone pad, wherein the body is a switch that is configured to be operated by a vehicle occupant to control operation of a window of the vehicle, and wherein the rotation of the switch activates the silicone pad to control the movement of the window.

19. The user interface assembly of claim 18 wherein the second portion includes a bottom surface that is configured to receive light emanating from the light source, and wherein the pivot is provided between the end of the first portion and the bottom surface of the second portion.

20. The vehicle component of claim 19 wherein first portion of the body comprises at least two edge surfaces provided at opposing sides of the first portion relative to the rear surface to provide edge lighting in at least two opposing directions on the body.

* * * * *

UNITED STATES PATENT AND TRADEMARK OFFICE
CERTIFICATE OF CORRECTION

| | |
|---|---|
| PATENT NO. | : 8,641,250 B2 |
| APPLICATION NO. | : 12/663026 |
| DATED | : February 4, 2014 |
| INVENTOR(S) | : Smith |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 646 days.

Signed and Sealed this
Second Day of June, 2015

Michelle K. Lee
*Director of the United States Patent and Trademark Office*